UNITED STATES PATENT OFFICE.

JOHN McNEVIN, OF BROOKLYN, ASSIGNOR OF ONE-HALF TO JOSEPH I. C. CLARKE, OF NEW YORK, N. Y.

TRANSPARENT PICTURE.

SPECIFICATION forming part of Letters Patent No. 454,560, dated June 23, 1891.

Application filed August 9, 1890. Serial No. 361,593. (Specimens.)

*To all whom it may concern:*

Be it known that I, JOHN MCNEVIN, a citizen of the United States, and a resident of Brooklyn, in the county of Kings and State of New York, have invented certain new and useful Transparent Pictures, of which the following is a specification.

The object of my invention is to produce a printed picture which shall, when held up to the light, give the effect of a colored translucent picture.

Heretofore it has been the practice when colored transparent pictures were desired to be produced either to color the material through its entire substance, as in stained glass, or in the paper or other imitations of stained glass and similar window-decorations to print the colors on the front surface of the paper or other material, and then either from its own thinness or through the paper or other material being treated with some glazing material—as, for instance, varnish—gain the desired effect of a transparent or translucent colored picture. Finding that delicate gradations of tone or sharpness and delicacy of outline were either lost or unattainable by the aforesaid treatment, I devised my invention, by which any print, sketch, or photograph, even of the finest or best kind, can be made, when held up to the light, to show the effect of a colored picture without injury to the face of the print or photograph itself.

My invention consists in providing the picture with a duplicate colored representation at its back in such manner that the colors will not show through when the picture is shown by reflected or direct light, the whole being adapted, however, to allow the light to pass through when it is held up between the observer and the source of light, so that the picture will show at will as a colored translucent picture. The duplicate colored representation may be made by applying color directly to the back of the sheet of material upon which the picture itself is printed, such colored representation being made by printing or by hand-painting, or by both, in such manner that the colors will not show at the front of the picture by reflected or direct light. Ordinarily I make the picture to be seen by direct light upon a thin sheet of paper, which is sufficiently opaque to prevent the colors showing through by reflected light, but is semi-transparent or translucent, so that they will clearly show by light transmitted through the picture. The duplicate colored representation might likewise be made upon another sheet of material of the same or a different kind from that upon which the picture to be seen by direct light is printed. Any material will do for the colored representation, which is translucent to a greater or less degree, as desired; but I ordinarily prefer to use paper for the sake of cheapness. The colored translucent sheet is cemented directly to the back of the front picture, and the coloring is done, preferably, upon the surface next to the sheet carrying the front picture. The back of the completed picture may be covered, if desired, with a sheet of protective material which is translucent. By thus providing the print with a duplicate translucent colored representation in the manner described, or in any other suitable manner, I am enabled not only to produce a picture in which the effects of a colored picture may be obtained at pleasure without marring or injuring the front print seen by reflected light, but also attain clear and good definition in the colored representation, especially when the front picture is made upon thin material, like paper, owing to the fact that the colors are close to the lines of the front picture. Besides, the colored representation may be more accurately and artistically made in those cases where the coloring is done upon a print the same as the face of the picture. The colored picture, whether made upon the same sheet or piece of material as the front picture or upon a separate piece, may be printed by any process in the desired colors originally; or, if desired, a print in monochrome, the same as the front picture, may be taken and colored on its face by hand or otherwise, as desired.

It would be within my invention to make the front print party-colored, but different from the back, thus giving to the observer a picture colored in one way when seen by reflected light and differently colored when the light is allowed to pass through it. My invention is, however, of greatest utility when applied to the production of pictures when printed on their face in monochrome, as in ordinary engravings, photographs, photogravures, etchings, and other prints made upon paper or similar material and printed or painted on the back in colors or backed with a colored duplicate of the figures on a separate sheet, such duplicate being colored on its face. In the case of pictures treated by my process, in which the coloring would be placed upon the back of the print itself, a sheet of plain paper or other more or less translucent material would be cemented to the back of the print for the purpose of preserving the colors, and, if necessary, softening the tones. Any desired cementing material may be employed—such, for instance, as a clear varnish, which will not discolor with time or injure the picture.

What I claim as my invention is—

1. The combination, with a printed picture, of a duplicate colored representation at its back applied, as described, so as not to show when the front picture is viewed by direct light, the whole adapted to show as a colored translucent picture when viewed by light transmitted through it.

2. A printed translucent picture having a separate duplicate representation in colors printed or painted upon its back or a duplicate representation in colors cemented to its back, such duplicate being colored upon its face, as and for the purpose described.

3. A printed picture made upon paper or similar partially-transparent material and backed with a duplicate representation in colors upon paper, as and for the purpose described.

4. A printed picture having a duplicate colored representation at its back and an interposed semi-transparent material, such as paper, whereby the picture seen by reflected or direct light only may show the color on its face alone, but when viewed by light transmitted through it may show as a colored translucent picture.

Signed at New York, in the county of New York and State of New York, this 1st day of August, A. D. 1890.

JOHN McNEVIN.

Witnesses:
WM. H. CAPEL,
HUGO KOELKER.